(12) United States Patent
Lee (10) Patent No.: US 11,447,213 B2
(45) Date of Patent: Sep. 20, 2022

(54) SUBMERGED-FLOATING TYPE WATER HOUSE

(71) Applicant: Young Seok Lee, Yongin-si (KR)

(72) Inventor: Young Seok Lee, Yongin-si (KR)

( * ) Notice: Subject to any disclaimer, the term of this patent is extended or adjusted under 35 U.S.C. 154(b) by 723 days.

(21) Appl. No.: 16/467,014

(22) PCT Filed: Dec. 4, 2017

(86) PCT No.: PCT/KR2017/014104
§ 371 (c)(1),
(2) Date: Jun. 5, 2019

(87) PCT Pub. No.: WO2018/105977
PCT Pub. Date: Jun. 14, 2018

(65) Prior Publication Data
US 2019/0300131 A1    Oct. 3, 2019

(30) Foreign Application Priority Data

Dec. 6, 2016    (KR) ........................ 10-2016-0165266

(51) Int. Cl.
*B63B 35/44* (2006.01)
*B63B 19/00* (2006.01)
(Continued)

(52) U.S. Cl.
CPC .............. *B63B 35/44* (2013.01); *B63B 19/00* (2013.01); *B63B 19/08* (2013.01); *B63B 29/02* (2013.01);
(Continued)

(58) Field of Classification Search
CPC .......... B63B 35/00; B63B 35/44; B63B 13/00; B63B 19/00; B63B 19/08; B63B 29/00;
(Continued)

(56) References Cited

U.S. PATENT DOCUMENTS 6,073,573 A * 6/2000 Gruber .................... B63B 35/44
114/264
8,170,734 B2    5/2012 Kaji

FOREIGN PATENT DOCUMENTS

JP    H10-119885 A    5/1998
JP    2001-322593 A   11/2001
(Continued)

OTHER PUBLICATIONS

KR Decision of Grant dated Feb. 27, 2018 as received in Application No. 10-2016-0165266.
(Continued)

*Primary Examiner* — Lars A Olson
(74) *Attorney, Agent, or Firm* — Maschoff Brennan (57) ABSTRACT

The present invention relates to a submerged-floating type water house. The house comprises: a first lower side part and a second lower side part formed symmetrically with respect to each other; a first upper side part and a second upper side part formed symmetrically and extending from the first lower side part and the second lower side part; and a front part and a rear part formed in front of and in back of the first lower side part and second lower side part and the first upper side part and second upper side part, thereby forming a rhombic-shaped body and floating in water.

9 Claims, 5 Drawing Sheets

(51) Int. Cl.
  *B63B 19/08* (2006.01)
  *B63B 29/02* (2006.01)
  *B63B 39/02* (2006.01)
  *B63H 21/22* (2006.01)
  *B63H 25/04* (2006.01)
  *G05D 1/02* (2020.01)
  *B63B 35/00* (2020.01)

(52) U.S. Cl.
  CPC ............ *B63B 39/02* (2013.01); *B63H 21/22* (2013.01); *B63H 25/04* (2013.01); *G05D 1/0206* (2013.01); *B63B 2035/007* (2013.01); *B63B 2035/4426* (2013.01); *B63B 2035/4453* (2013.01); *B63B 2209/18* (2013.01); *B63B 2213/02* (2013.01); *B63H 2025/045* (2013.01); *Y02A 30/00* (2018.01)

(58) Field of Classification Search
  CPC ......... B63B 29/02; B63B 39/00; B63B 39/02; B63B 2035/4453; B63B 2209/18; B63B 2213/02; B63H 21/00; B63H 21/22; B63H 25/00; B63H 25/04; B63H 2025/045; G05D 1/0206
  USPC ............................ 114/264, 266, 267; 701/26
  See application file for complete search history.

(56) References Cited

FOREIGN PATENT DOCUMENTS

| | | |
|---|---|---|
| JP | 2010-126085 A | 6/2010 |
| KR | 2010-0041456 A | 4/2010 |
| KR | 10-2011-0111997 A | 10/2011 |
| KR | 2013-0035307 A | 4/2013 |
| KR | 10-2013-0096083 A | 8/2013 |

OTHER PUBLICATIONS

KR Office Action dated Nov. 17, 2017 as received in Application No. 10-2016-0165266.

* cited by examiner

SUBMERGED-FLOATING TYPE WATER HOUSE

TECHNICAL FIELD

The present invention relates to a submerged-floating type water house, and more particularly to a submerged-floating type water house, which may move while floating in the seawater of a resort, a tourist site, or the like, or in the water of a river or the like, for example, of a lake, a downtown area, or the like, and in which a person may reside.

BACKGROUND ART

In recent years, as the income levels have increased and the living conditions have improved, it has become generalized to go on vacation to the mountains or the sea together with the families, the lovers, or the friends, and in particular, it also has become common to go on vacation to water sites, such as the sea, the lakes, and the rivers, and enjoy water sports, such as fishing, water-skiing, and scuba diving.

In order to satisfy the demands of the consumers, water facilities and leisure facilities of various forms, which are equipped with accommodations such that people may enjoy accommodation including meals and lodging and water sports, have been built at the watersides, which have beautiful scenery and clear water, mainly in the famous tourist sites.

However, it requires high costs to provide accommodations of a firm structure using iron bars or concrete at the watersides or on the water, and building of the accommodations is strictly restricted due to the concern about the environmental contaminations and destruction of nature.

In addition, recently, instead of the large-scaled accommodations in which many people live at the same time, individual accommodations, which are environment-friendly and close to nature, and in which people may live in unit of a small number of persons while not being hampered by the other persons, have been spotlighted.

Therefore, in recent years, accommodations, which are equipped with simple frame structures in the form of cabins in the watersides to be rented to the tourists, have been increasing.

However, the conventional individual accommodations may require high costs and destruct the environments as well because they occupy specific spaces in the lands around the watersides, and it is inconvenient to use a separate ship to enjoy the water sports.

The prior documents related to the technical fields of the present invention include Korean Patent Application Publication No. 2010-0041456 (2010 Apr. 22) and Korean Patent Application Publication No. 2013-0035307 (2013 Apr. 9).

DISCLOSURE

Technical Problem

The present invention has been made in an effort to solve the above-mentioned problems, and provides a submerged-floating type water house, which floats in water, for example, of the sea, lakes, or rivers, and by which a person may enjoy water sports or the like at a site that is close to the water site, and which may be easily installed and demolished if necessary to restrain environmental contaminations.

The present invention also provides a submerged-floating type water house, which may autonomously move manually or through a remote control, on the basis of a GPS in a state in which the submerged-floating type water house floats in water, and generates its own electric power to allow use of electric apparatuses, thereby providing various conveniences.

The present invention also provides a submerged-floating type water house, which may move on the basis of a GPS in a river or a lake, for example, of a downtown area, and may move to a desired location when a tourist or a guest make a reservation by using an application or the like, thereby providing conveniences.

The present invention also provides a submerged-floating type water house which allows a person to enter and exit from the water house in a dock or the like, by adjusting the inclination of the water house in a state in which the water house floats in water as a ballast moves.

The problems of the present invention are not limited thereto, and other unmentioned problems of the present invention may be clearly appreciated by those skilled in the art from the following descriptions.

Technical Solution

A submerged-floating type water house according to an embodiment of the present invention for solving the above-mentioned problems includes: a first lower side part and a second lower side part formed to be symmetrical with respect to each other; a first upper side part and a second upper side part extending from the first lower side part and the second lower side part and formed to be symmetrical with respect to each other; and a front part and a rear part formed on a front side and a rear side of the first lower side part and the second lower side part, and the first upper side part and the second upper side part, whereby the submerged-floating type water house forms a rhombic body and floats in water.

In this case, solar panels, which are folded or unfolded horizontally, may be disposed in the first upper side part and the second upper side part, and an entrance door, though which a person enters and exits, may be disposed in the first upper side part or the second upper side part.

Then, the entrance door may include a footplate part unfolded to be inclined downwards, and a foldable part folded upwards.

Further, a balcony may be formed in at least one of the front part or the rear part.

Further, a rotary shaft may be installed lengthwise at a central lower side of the first lower side part and the second lower side part, a ballast, which is movable forwards and rearwards, may installed in the rotary shaft, and the ballast may move to adjust an inclination of the body as the rotary shaft rotates.

Meanwhile, the submerged-floating type water house may further include a propellant configured to allow the body to move in a selected direction, a GPS module capable of acquiring information on a current location of the body and information on a location, to which the body is to move, and a control unit configured to control the body to move to a preset location by controlling the propellant on the basis of the location information of the body acquired by the GPS module.

Then, the control unit, after a mobile communication terminal receives the information on the location of the body acquired by the GPS module through a communication network, may receive the information on the location, to which the body is to move, from the mobile communication terminal, and, when receiving the location information, may control the propellant such that the body moves to the received location.

Further, the submerged-floating type water house may further include a distance sensor capable of detecting another structure around the body, and when the other structure is detected around the body by the distance sensor, the control unit may control the propellant such that the body stops or detours.

The other details of the present invention are provided in a detailed description of the invention and the drawings.

Advantageous Effects

According to the submerged-floating type water house according to the embodiment of the present invention, by providing the water house which floats in water, for example, of the sea, lakes, or rivers, a person may enjoy water sports or the like at a site that is close to the water site, and environmental contaminations may be restrained by easily installing and demolishing the water house if necessary.

Further, according to the submerged-floating type water house according to the embodiment of the present invention, the submerged-floating type water house may move manually or autonomously through a remote control based on a GPS in a state in which the water house floats in water, and conveniences may be improved by supplying its own electric power and using various electric apparatuses.

Furthermore, according to the submerged-floating type water house according to the embodiment of the present invention, people may enter or exit from the water house more easily, for example, in a dock or the like, by adjusting the inclination of the water house in a state in which the water house floats in water as the ballast moves.

In addition, according to the submerged-floating type water house according to the embodiment of the present invention, the water house may easily move to a site desired by a tourist or a guest, remarkably enhancing conveniences since the water house may autonomously move in water when the tourist or the guest makes a reservation to get on the water house at the site set through an application or through online.

The effects of the present invention are not limited to the above-exemplified contents, and more various effects are included in the specification.

BEST MODE

The above and other aspects, features and advantages of the invention will become apparent from the following description of the following embodiments given in conjunction with the accompanying drawings. However, the present invention is not limited to the embodiments disclosed below, but may be implemented in various forms. The embodiments of the present invention is provided to make the disclosure of the present invention complete and fully inform those skilled in the art to which the present invention pertains of the scope of the present invention. The same reference numerals denote the same elements throughout the specification.

Therefore, in some embodiments, well-known process steps, well-known structures, and well-known technologies will not be described in detail to avoid unclear interpretation of the present invention.

The terms used herein are provided to describe the embodiments but not to limit the present invention. In the specification, the singular forms include plural forms unless particularly mentioned. The term 'comprises' and/or 'comprising' used in the specification means that the mentioned elements, steps, and/or operations do not exclude presence or addition of one or more other elements, steps, and/or operations. Further, the term 'and/or' includes each of the mentioned items and all combinations of one or more of them.

Further, the embodiments described in the specification will be described with reference to perspective views, cross-sectional views, side views and/or schematic views, which are ideal exemplary views of the present invention. Accordingly, the forms of the exemplary views may be modified by the manufacturing technologies and/or allowable tolerances. Accordingly, the embodiments of the present invention are not limited to the illustrated specific forms, but include changes of the forms produced according to the manufacturing processes. Further, in the drawings illustrated in the embodiment of the present invention, the elements may be rather enlarged or downscaled in consideration of convenience of description thereof.

Hereinafter, a preferred embodiment of a submerged-floating type water house according to the present invention will be described in detail with reference to the accompanying drawings.

Figure 1:
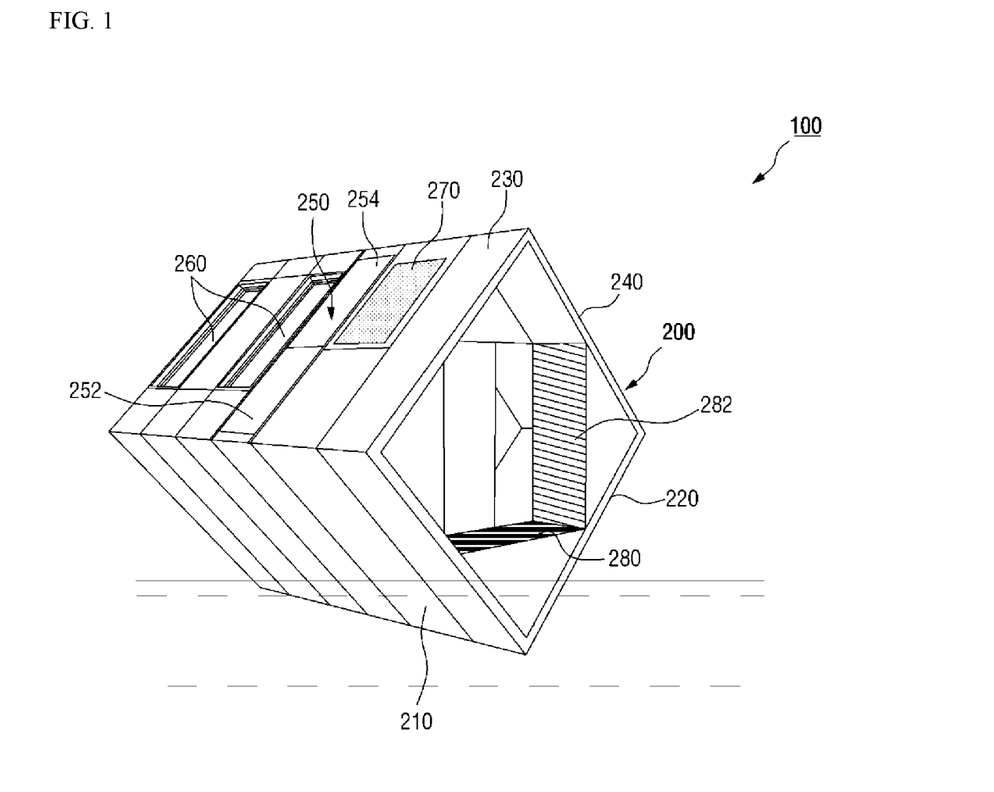
FIG. 1 is a perspective view of a submerged-floating type water house according to an embodiment of the present invention.
Figure 2:
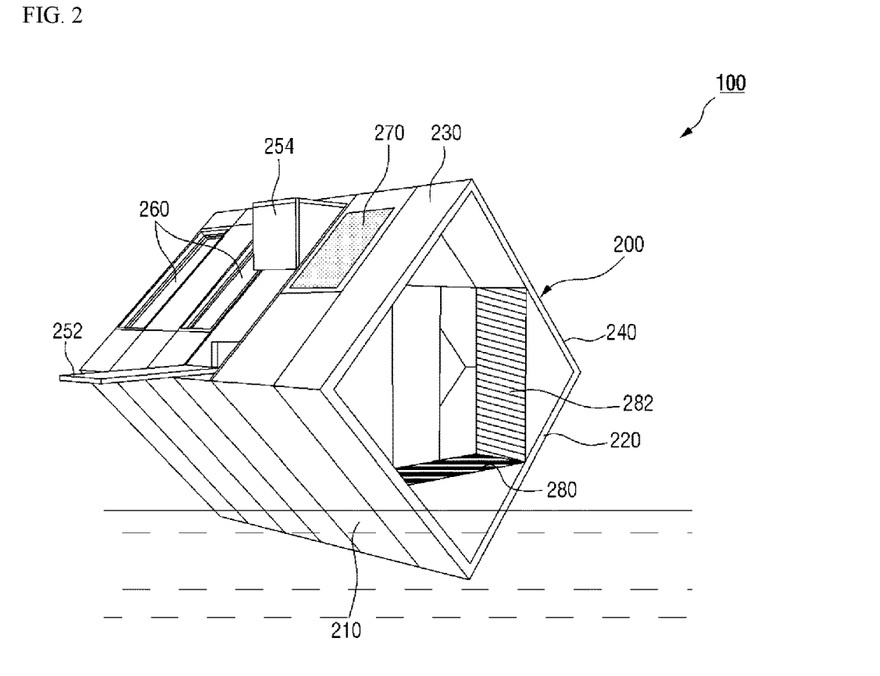
FIG. 2 is a perspective view of FIG. 1 in a state in which an entrance is opened.
Figure 3:
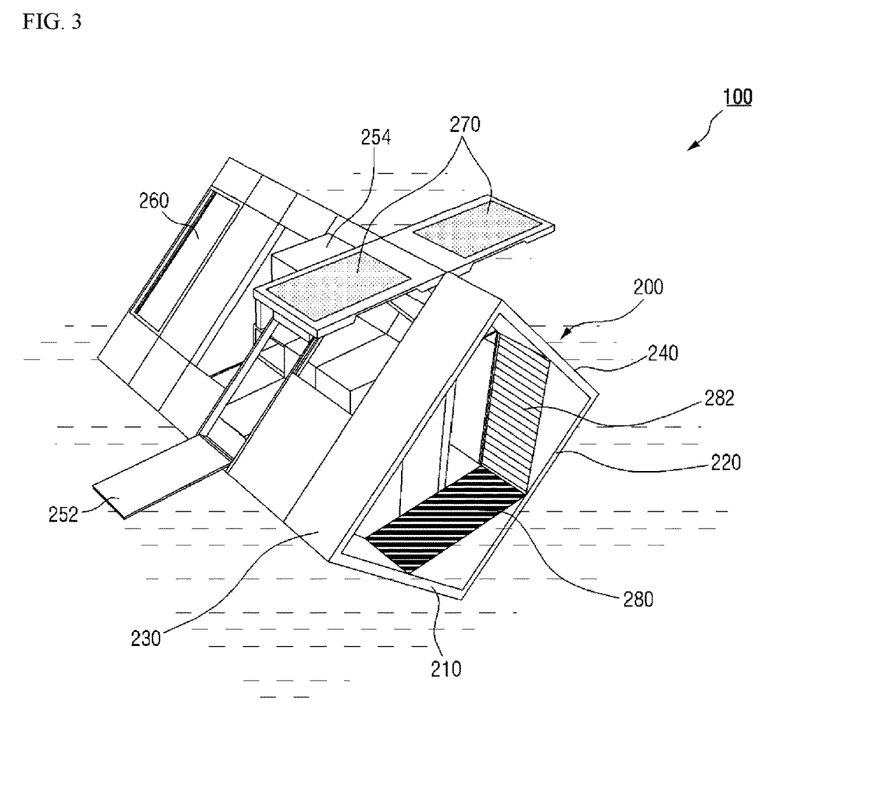
FIG. 3 is a perspective view of FIG. 2 in a state in which solar panels are unfolded.

FIG. 1 is a perspective view of a submerged-floating type water house according to an embodiment of the present invention. FIG. 2 is a perspective view of FIG. 1 in a state in which an entrance is opened. FIG. 3 is a perspective view of FIG. 2 in a state in which solar panels are unfolded.

Figure 4:
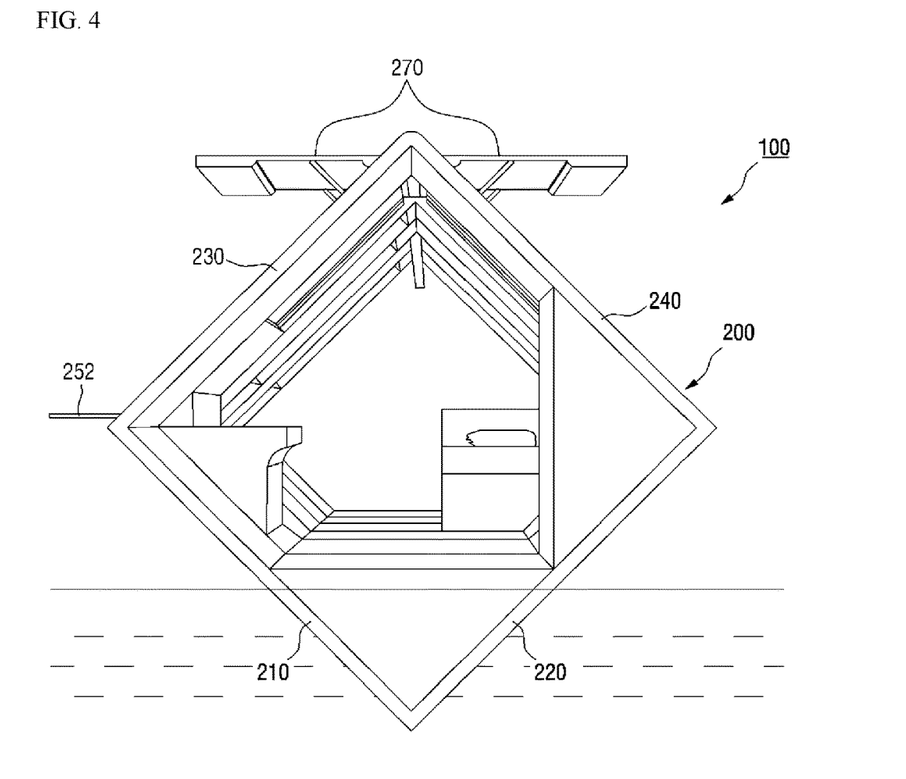
FIG. 4 is a front view of FIG. 3.
Figure 5:
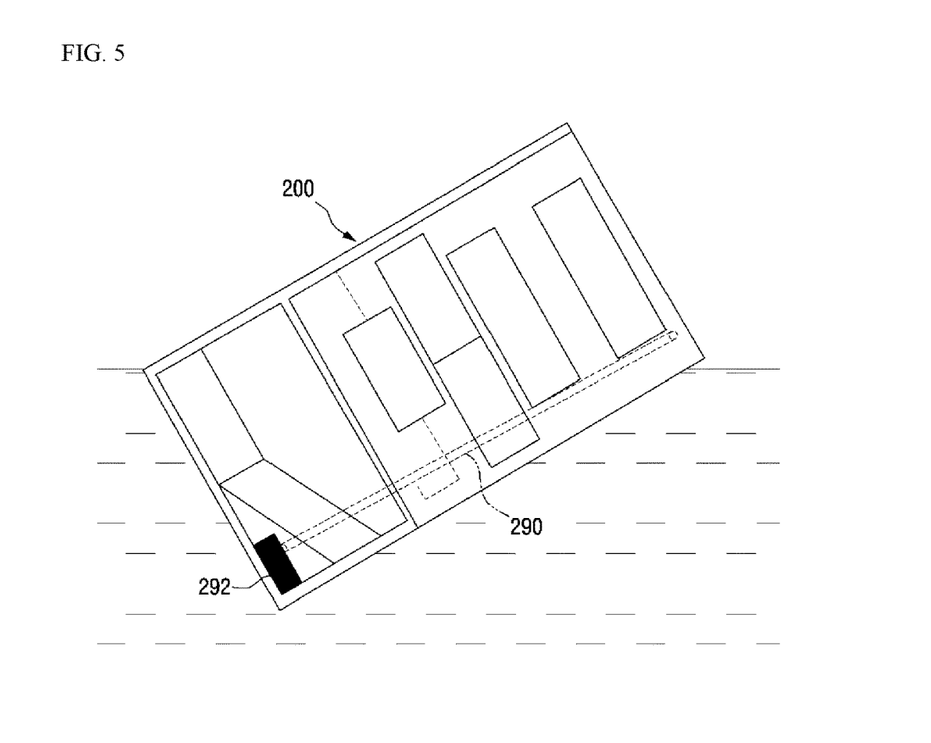
FIG. 5 is a side diagram schematically illustrating a state in which the submerged-floating type water house according to the embodiment of the present invention is inclined as the center of a ballast moves.
Figure 6:
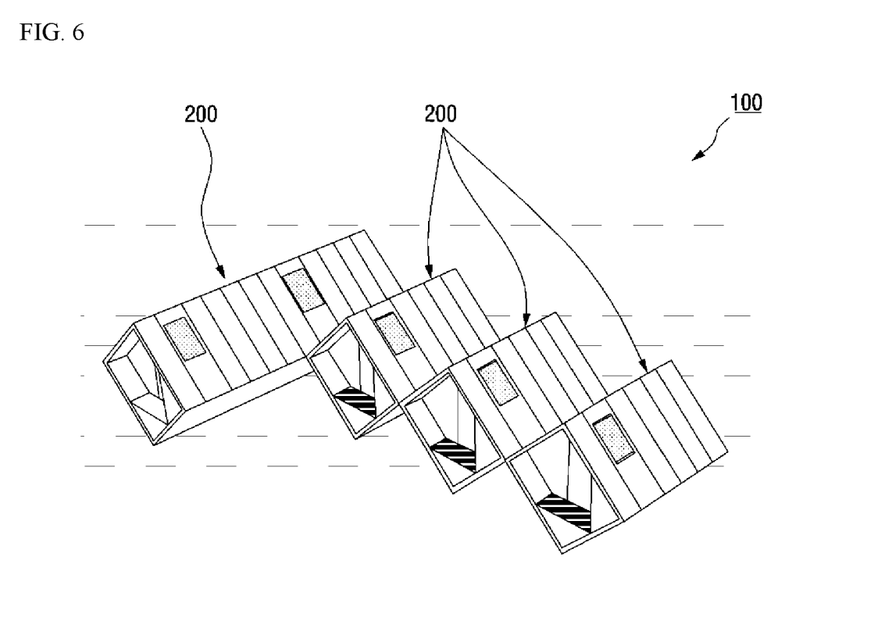
FIG. 6 is a perspective view illustrating a state in which the submerged-floating type water houses according to an embodiment of the present invention are connected to each other.

Further, FIG. 4 is a front view of FIG. 3. FIG. 5 is a side diagram schematically illustrating a state in which the submerged-floating type water house according to the embodiment of the present invention is inclined as the center of a ballast moves.

As illustrated in FIGS. 1 to 5, the submerged-floating type water house 100 according to the embodiment of the present invention has a body 200, which floats in water and has a hexahedral shape.

Here, the hexahedral body 200 may form a state in which the body 200 floats in water in a rhombic shape when viewed from the front side or the rear side.

The hexahedral body 200 may include a first lower side part 210 and a second lower side part 220, portions of which are submerged in water, and a first upper side part 230 and a second upper side part 240 extending from the first lower side part 210 and the second lower side part 220.

Here, the first lower side part 210 and the second lower side part 220 are formed to be symmetrical with respect to each other, and the first upper side part 230 and the second upper side part 240 also are formed to be symmetrical with respect to each other such that the body 200 may float in water while forming a rhombic shape when viewed from the front side or the rear side.

In addition, the hexahedral body 200 may be formed by forming a front surface part and a rear surface part on a front surface and a rear surface of the first lower side part 210 and the second lower side part 220, and the first upper side part 230, and the second upper side part 240, respectively.

Here, a balcony 280 may be formed in any one or both of the front surface part and the rear surface part, and a balcony door 282 which allows a person to enter and exit from the balcony 280 may be formed.

Further, an entrance door 250 which is opened and closed such that a person may enter or exit from the interior, and a window 260 may be formed in the first upper side part 230 or the second upper side part 240.

Further, solar panels 270 which may be unfolded to a horizontal state as the solar panels 270 rotate may be formed in the first upper side part 230 and the second upper side part 240.

The entrance door 250 may include a footplate part 252 on which a person may pass while stepping on the footplate part 252, and a foldable part 254 which is folded upwards in two stages to prevent the head of a person from colliding with the entrance door 250.

Meanwhile, the interior of the body 200 of the submerged-floating type water house 100 according to the present invention may be equipped with various electric appliances which receive electricity to be operated, and convenience facilities, such as desks, beds, sofas, in which people may take rests.

Further, the interior of the body 200 may be equipped with an electric power storage unit 400 for storing electric power charged by the solar panels 270, and the electric power storage unit 400 may supply electric power to the various electric appliances provided in the interior of the body 200.

Meanwhile, although not illustrated, the submerged-floating type water house 100 according to the embodiment of the present invention includes an anchor, and thus may prevent the water house 100 from moving due to tidal currents or wind and stay at one site as the anchor is fixed at a preset location.

An operational relationship of the submerged-floating type water house 100, which may have the above-mentioned configuration, will be described as follows.

First, when a person is to enter or exit from the submerged-floating type water house 100 according to the embodiment of the present invention to get on or off the water house 100, as illustrated in FIG. 2, the entrance door 250 may be opened.

That is, if the footplate part 252 is unfolded to be inclined downwards and the foldable part 254 is folded, an entrance, through which a general adult may enter or exit, is formed and the adult may enter or exit from the submerged-floating type water house 100 through the entrance.

Meanwhile, in a state in which a person has entered the submerged-floating type water house 100 according to the embodiment of the present invention, the person may watch the scenery of the outside through the window 260 and allow sunlight to be introduced into the interior through the window 260.

Further, referring to FIGS. 3 and 4, the solar panels 270 formed in the first upper side part 230 and the second upper side part 240 of the body 200 may be unfolded to a horizontal state or may maintain an folded state, and when the sun is located high, for example, at noon, the solar panels 270 are unfolded to a horizontal state so that a larger amount of electric power may be generated by the sunlight and charged.

Then, as illustrated in FIGS. 3 and 4, when the solar panels 270 are unfolded to a horizontal state, the interior of the body 200 also communicates with the outside, and thus the interior of the body 200 may be ventilated and the scenery of the outside may be watched.

In addition, in the body 200 of the submerged-floating type water house 100 according to the embodiment of the present invention, a person may enter and exit from the balcony 280 if the balcony doors 282 formed in the front surface part and the rear surface part are opened, and may enjoy fishing or the like in the balcony 280 or may submerge under the water or exit from the water through the balcony 280 for scuba diving or the like.

Meanwhile, referring to FIG. 5, the inclination of the submerged-floating type water house 100 according to the present invention may be adjusted in a state in which the water house 100 floats in the water, by moving the ballast 292.

That is, the ballast 292 installed in a rotary shaft 290 may move forwards or rearwards as the rotary shaft 290 rotates, and as the ballast 292 moves, the inclination of the submerged-floating type water house 100 may be adjusted.

For example, if the ballast 292 moves to one side as the rotary shaft 290 rotates when water is full in the balcony 280 on the front or rear side, a portion of the submerged-floating type water house 100, as shown in FIG. 5, at which the ballast 292 is located, submerges under the water and thus a portion of the submerged-floating type water house 100, at which the ballast 292 is not located, is raised so that the submerged-floating type water house 100 is inclined.

Accordingly, as the direction, in which the balcony 280 is located, is further raised with respect to the water surface, the water may be prevented from being introduced into the body 200 through the balcony 280.

In this way, since the inclination of the body 200 is adjusted as the ballast 292 moves, people may enter or exit more easily in a dock or the like.

That is, because the height of the entrance door 250 is adjusted by adjusting the inclination of the body 200 as the ballast 292 moves, people may enter or exit more easily.

Meanwhile, the submerged-floating type water house 100 according to the embodiment of the present invention may be made to move in the water by a propellant 300 of a propeller or the like.

Figure 7:
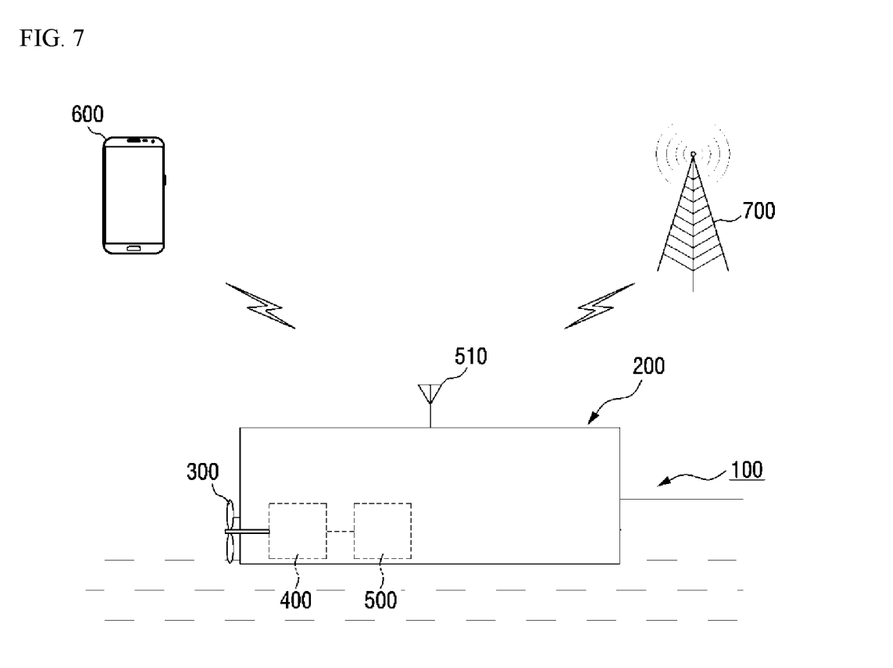
FIG. 7 is a mimetic diagram schematically illustrating a relationship in which the submerged-floating type water house according to the embodiment of the present invention acquires location information on the basis of a GPS and moves through communication.
Figure 8:
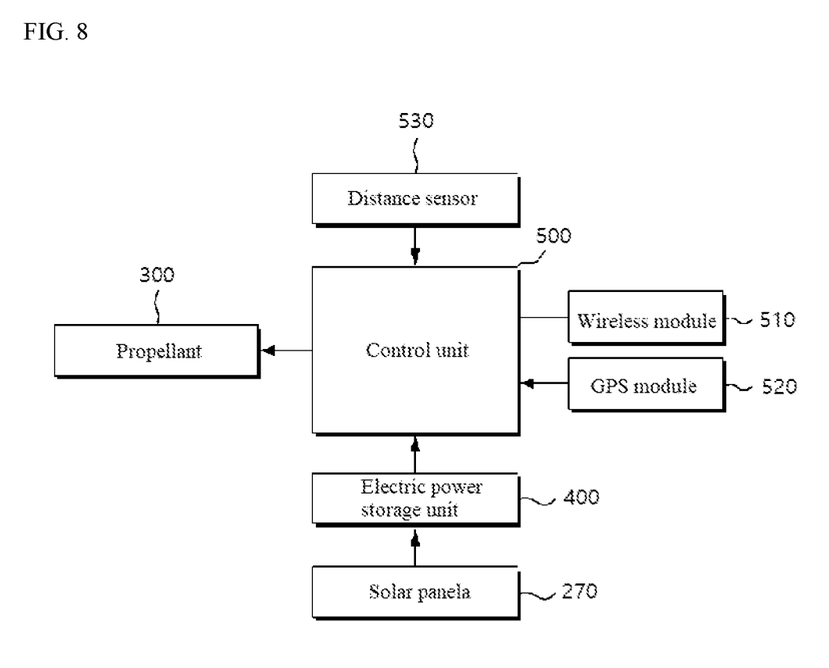
FIG. 8 is a block diagram illustrating communication and control relationships of the submerged-floating type water house according to the embodiment of the present invention.

FIG. 7 is a mimetic diagram schematically illustrating a relationship of the submerged-floating type water house 100 according to the embodiment of the present invention, which acquires location information based on a GPS and moves through communication. FIG. 8 is a block diagram illustrating communication and control relationships of the submerged-floating type water house 100 according to the embodiment of the present invention.

Referring to FIGS. 7 and 8, the submerged-floating type water house 100 according to the embodiment of the present invention may include a propellant 300, and accordingly, may move on the water.

That is, the submerged-floating type water house 100 according to the embodiment of the present invention may include a propellant 300 including a general screw, a direction key, and a motor and transmissions for the operations thereof.

The propellant 300 is operated by a control signal of a control unit 500, which will be described below, and may receive a power source from the electric power storage unit 400 charged with electric power by the solar panels 270 to be operated.

Further, the submerged-floating type water house 100 according to the embodiment of the present invention may include a distance sensor 530, and the distance sensor 530 may include a general ultrasonic sensor to detect a surrounding object and recognize a distance between the water house 100 and the surrounding object to prevent collision or the like.

Referring to FIG. 8, the control unit 500 includes a wireless module 510, and the wireless module 510 may communicate with a mobile communication terminal through a communication net base station of a public communication network.

That is, the control unit 500 may be configured to perform communication not through direction communication with the mobile communication terminal but through a public network.

Further, the control unit 500 may acquire location information of the submerged-floating type water house 100 through communication with the mobile communication terminal.

Meanwhile, the control unit 500 may receive control commands of a GPS module 520, the distance sensor 530, and the mobile communication terminal and perform the corresponding controls.

Here, the control unit 500 may control the propellant 300 at a direction and a speed of the submerged-floating type water house 100 by inputting the corresponding direction and speed through the mobile communication terminal.

Then, the control unit 500 may acquire location information on a route between the current location and a moved point through the GPS module 520, and may input the direction, the speed, and the like according to the corresponding route and transmit the input direction and speed to the mobile communication terminal.

Accordingly, the mobile communication terminal may set a desired route and input a command for autonomous navigation, and in this case, the control unit 500 may control the propellant 300 such that the water house 100 may autonomously move along a preset route.

Accordingly, after acquiring location information on the current location by using the mobile communication terminal of a person, the person in the submerged-floating type water house 100 according to the embodiment of the present invention may input a location, to which the person is to move, by using the mobile communication terminal to control such that the water house 100 may autonomously move in the water.

In this case, when another structure (for example, a ship, another water house 100, or the like) is located on the front side or a lateral side of the submerged-floating type water house 100 while the water house 100 moves, the location of the other structure may be detected by the distance sensor 530 and the water house 100 may be controlled to stop or detour when the other structure is detected.

For reference, although it has been described as an example that the submerged-floating type water house 100 according to the embodiment of the present invention moves autonomously, it is apparent that the water house 100 may be controlled to move manually by directly adjusting the propellant 300 with a steering device.

It will be understood by an ordinary person skilled in the art to which the present invention pertains that the present invention may be carried out in other detailed forms than the disclosed embodiments without changing the technical spirit or the essential features. Therefore, the above-described embodiments are exemplary in all aspects, and should be construed not to be restrictive. The scope of the present invention is determined by the claims rather than the description of the invention, and all changes or modifications derived from the meanings and scopes of the claims and the equivalents thereof are construed to be included in the scope of the present invention.

DESCRIPTION OF REFERENCE NUMERALS

100: submerged-floating type water house
200: Body
210: First lower side part
220: Second lower side part
230: First upper side part
240: Second upper side part
250: Entrance door
252: Footplate part
254: Foldable part
260: Window
270: Solar panel
280: Balcony
282: Balcony door
290: Rotary shaft
290: Ballast
300: Propellant
400: Electric power storage unit
500: Control unit
510: Wireless module
520: GPS module
530: Distance sensor
600: Mobile communication terminal
700: Communication network base station

The invention claimed is:

1. A submerged-floating type water house comprising:
a first lower side part and a second lower side part formed to be symmetrical with respect to each other;
a first upper side part and a second upper side part extending from the first lower side part and the second lower side part and formed to be symmetrical with respect to each other; and
a front part and a rear part formed on a front side and a rear side of the first lower side part and the second lower side part, and the first upper side part and the second upper side part,
whereby the submerged-floating type water house forms a rhombic body and floats in water,
wherein solar panels, which are folded or unfolded horizontally, are disposed in the first upper side part and the second upper side part.

2. The submerged-floating type water house of claim 1, wherein an entrance door, through which a person enters and exits, is disposed in the first upper side part or the second upper side part.

3. The submerged-floating type water house of claim 2, wherein the entrance door includes:
  a footplate part unfolded to be inclined downwards; and
  a foldable part folded upwards.

4. The submerged-floating type water house of claim 1, wherein a balcony is formed in at least one of the front part or the rear part.

5. The submerged-floating type water house of claim 1, wherein a rotary shaft is installed lengthwise at a central lower side of the first lower side part and the second lower side part, a ballast, which is movable forwards and rearwards, is installed in the rotary shaft, and the ballast moves to adjust an inclination of the body as the rotary shaft rotates.

6. The submerged-floating type water house of claim 1, further comprising:
  a propellant configured to allow the body to move in a selected direction;
  a GPS module capable of acquiring information on a current location of the body and information on a location, to which the body is to move; and
  a control unit configured to control the body to move to a preset location by controlling the propellant on a basis of the location information of the body acquired by the GPS module.

7. The submerged-floating type water house of claim 6, wherein the control unit, after a mobile communication terminal receives the information on the location of the body acquired by the GPS module through a communication network, receives the information on the location, to which the body is to move, from the mobile communication terminal, and, when receiving the location information, controls the propellant such that the body moves to the received location.

8. The submerged-floating type water house of claim 6, further comprising:
  a distance sensor capable of detecting another structure around the body.

9. The submerged-floating type water house of claim 8, wherein, when another structure is detected around the body by the distance sensor, the control unit controls the propellant such that the body stops or detours.

\* \* \* \* \*